US012335033B2

(12) United States Patent
Zachman et al.

(10) Patent No.: US 12,335,033 B2
(45) Date of Patent: *Jun. 17, 2025

(54) SERVER SELECTED VARIABLE BITRATE STREAMING

(71) Applicant: Comcast Cable Communications, LLC, Philadelphia, PA (US)

(72) Inventors: Cory Zachman, Denver, CO (US); Guy Grigsby, Denver, CO (US); Carl Veazey, Longmont, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/439,960

(22) Filed: Feb. 13, 2024

(65) Prior Publication Data

US 2024/0187124 A1 Jun. 6, 2024

Related U.S. Application Data

(63) Continuation of application No. 17/692,746, filed on Mar. 11, 2022, now Pat. No. 11,936,469, which is a continuation of application No. 16/566,519, filed on Sep. 10, 2019, now Pat. No. 11,303,382, which is a continuation of application No. 15/726,156, filed on Oct. 5, 2017, now Pat. No. 10,461,884.

(51) Int. Cl.
*H04L 1/00* (2006.01)
*H04L 5/00* (2006.01)
*H04L 43/0805* (2022.01)
*H04L 43/0864* (2022.01)
*H04W 28/16* (2009.01)

(52) U.S. Cl.
CPC .......... *H04L 1/0002* (2013.01); *H04L 5/0053* (2013.01); *H04L 43/0805* (2013.01); *H04L 43/0864* (2013.01); *H04W 28/16* (2013.01)

(58) Field of Classification Search
CPC . H04L 1/0002; H04L 5/0053; H04L 43/0805; H04L 43/0864; H04W 28/16; H04W 28/0257; H04W 28/0268
See application file for complete search history.

(56) References Cited

U.S. PATENT DOCUMENTS 6,704,576 B1  3/2004  Brachman et al.
7,546,120 B1  6/2009  Ulvenes
(Continued)

FOREIGN PATENT DOCUMENTS

CN    104918072 A    9/2015
WO    2015004276 A2  1/2015

OTHER PUBLICATIONS

U.S. Appl. No. 14/513,755 (2016/0105505), filed Oct. 14, 2014 (Apr. 14, 2016), Ross Gilson (Comcast Cable Communications, LLC).
(Continued)

*Primary Examiner* — Abdelnabi O Musa
(74) *Attorney, Agent, or Firm* — Ballard Spahr LLP

(57) ABSTRACT

Methods, systems, and apparatuses are disclosed for server selected bitrate streaming. A server receives a request from a user device for data segments at a first bitrate. The server determines a second bitrate for transmission of the data segments to the user device. The server transmits the requested data segments at the determined second bitrate.

45 Claims, 5 Drawing Sheets

(56) References Cited

U.S. PATENT DOCUMENTS

| | | |
|---|---|---|
| 7,558,262 B2 | 7/2009 | Tonjes et al. |
| 8,813,143 B2 | 8/2014 | Hasek |
| 8,826,349 B2 | 9/2014 | Joe et al. |
| 9,237,461 B1 | 1/2016 | Zhou et al. |
| 9,769,795 B2 | 9/2017 | McEvilly |
| 10,461,884 B2 | 10/2019 | Zachman et al. |
| 2001/0025377 A1 | 9/2001 | Hinderks |
| 2002/0138852 A1 | 9/2002 | Reynolds et al. |
| 2002/0198506 A1 | 12/2002 | Whalen et al. |
| 2003/0115274 A1 | 6/2003 | Weber |
| 2003/0115294 A1 | 6/2003 | Hoang |
| 2003/0134653 A1 | 7/2003 | Sarkkinen et al. |
| 2004/0015999 A1 | 1/2004 | Carlucci et al. |
| 2005/0220064 A1 | 10/2005 | Hundscheidt et al. |
| 2005/0220202 A1* | 10/2005 | Tzannes ............... H04L 47/18 375/260 |
| 2005/0232292 A1 | 10/2005 | Richards et al. |
| 2005/0233760 A1 | 10/2005 | Voltolina et al. |
| 2005/0265374 A1 | 12/2005 | Pelt |
| 2006/0074968 A1 | 4/2006 | Gyetko |
| 2007/0250861 A1 | 10/2007 | Angiolillo et al. |
| 2007/0266414 A1 | 11/2007 | Kahn et al. |
| 2008/0064425 A1 | 3/2008 | Kim et al. |
| 2008/0098446 A1 | 4/2008 | Seckin et al. |
| 2008/0195664 A1 | 8/2008 | Maharajh et al. |
| 2008/0306962 A1 | 12/2008 | Grannan et al. |
| 2009/0049485 A1 | 2/2009 | Agrawal et al. |
| 2009/0274224 A1 | 11/2009 | Harris |
| 2009/0310668 A1 | 12/2009 | Sackstein et al. |
| 2010/0118888 A1* | 5/2010 | Picco .................... H04L 47/10 370/468 |
| 2010/0316050 A1 | 12/2010 | Baykal et al. |
| 2011/0143651 A1 | 6/2011 | Marocchi et al. |
| 2011/0188439 A1 | 8/2011 | Mao et al. |
| 2011/0249631 A1 | 10/2011 | Li et al. |
| 2012/0140645 A1 | 6/2012 | Bonta et al. |
| 2012/0198506 A1 | 8/2012 | Joe et al. |
| 2012/0288259 A1 | 11/2012 | Gilson |
| 2012/0307149 A1 | 12/2012 | Meek et al. |
| 2013/0024582 A1 | 1/2013 | Rodrigues |
| 2013/0051300 A1 | 2/2013 | He et al. |
| 2013/0136049 A1 | 5/2013 | Song et al. |
| 2013/0142499 A1 | 6/2013 | Major et al. |
| 2013/0279391 A1 | 10/2013 | Gupta et al. |
| 2014/0050082 A1 | 2/2014 | Sun et al. |
| 2014/0149557 A1 | 5/2014 | Lohmar et al. |
| 2014/0194100 A1 | 7/2014 | Anchan |
| 2014/0269269 A1 | 9/2014 | Kovvali et al. |
| 2014/0279781 A1 | 9/2014 | Ling et al. |
| 2014/0355603 A1 | 12/2014 | Li et al. |
| 2014/0372624 A1 | 12/2014 | Wang et al. |
| 2015/0012929 A1 | 1/2015 | Huber |
| 2015/0036494 A1 | 2/2015 | Kotecha et al. |
| 2015/0092791 A1* | 4/2015 | Cornett ................ H04L 1/0034 370/468 |
| 2015/0180924 A1* | 6/2015 | O'Callaghan ....... H04L 43/0829 709/219 |
| 2015/0289003 A1 | 10/2015 | Huber et al. |
| 2016/0028646 A1 | 1/2016 | Fablet et al. |
| 2016/0105505 A1 | 4/2016 | Gilson |
| 2016/0105506 A1 | 4/2016 | Gilson |
| 2017/0111463 A1 | 4/2017 | Maze et al. |
| 2017/0126256 A1* | 5/2017 | Salomons ........... H03M 13/353 |
| 2017/0230442 A1 | 8/2017 | Denoual et al. |
| 2017/0280178 A1 | 9/2017 | Sun |
| 2018/0035147 A1 | 2/2018 | DeVreese et al. |
| 2018/0227142 A1* | 8/2018 | Horsley ................. H04B 3/36 |
| 2018/0278990 A1* | 9/2018 | Rutland ................. H04L 67/02 |
| 2019/0109669 A1 | 4/2019 | Zachman et al. |

OTHER PUBLICATIONS

U.S. Appl. No. 14/513,776 (2016/0105506), filed Oct. 14, 2014 (Apr. 14, 2016), Ross Gilson Comcast Cable Communications, LLC).

U.S. Appl. No. 18/410,654, filed Jan. 11, 2024, Ross Gilson (Comcast Cable Communications, LLC).

U.S. Appl. No. 18/424,349, filed Jan. 26, 2024, Ross Gilson (Comcast Cable Communications, LLC).

U.S. Appl. No. 15/726,156 (U.S. Pat. No. 10,461,884), filed Oct. 5, 2017 (Oct. 29, 2019), Cory Zachman (Comcast Cable Communications, LLC).

U.S. Appl. No. 16/566,519 (U.S. Pat. No. 11,303,382), filed Sep. 10, 2019 (Apr. 12, 2022), Cory Zachman (Comcast Cable Communications, LLC).

U.S. Appl. No. 17/692,746 (2022/0303043), filed Mar. 11, 2022 (Sep. 22, 2022), Cory Zachman (Comcast Cable Communications, LLC).

* cited by examiner

SERVER SELECTED VARIABLE BITRATE STREAMING

CROSS REFERENCE TO RELATED PATENT APPLICATIONS

This application claims priority under 35 U.S.C. § 120 to, and is a continuation of, U.S. patent application Ser. No. 17/692,746, filed on Mar. 11, 2022, which claims priority under 35 U.S.C. § 120 to, and is a continuation of, U.S. patent application Ser. No. 16/566,519, filed on Sep. 10, 2019, now U.S. Pat. No. 11,303,382, which claims priority under 35 U.S.C. § 120 to, and is a continuation of U.S. patent application Ser. No. 15/726,156, filed on Oct. 5, 2017, now U.S. Pat. No. 10,461,884, the entire contents of each of which are hereby incorporated herein by reference for all purposes.

BACKGROUND

To support variable bitrate streaming, a content item can be encoded into versions of varying bitrates. Existing implementations of variable bitrate streaming require the user device to determine a bitrate for the next data segment to be requested based on network conditions between the user device and the server known to the user device. These, as well as other shortcomings of the prior art, are addressed by the approaches set forth herein.

SUMMARY

It is to be understood that both the following general description and the following detailed description are exemplary and explanatory only and are not restrictive. Provided are methods and systems for server-selected variable bitrate streaming. A computing device can receive a request from a user device for a data segment. The request can identify a bitrate for the data segment. The request can request the data segment without identifying a bitrate. The computing device can then determine a bitrate at which the data segment will be transmitted to the user device based on network heuristics. The network heuristics can include overall network heuristics relative to the user device from which the request was received, as well as relative to other user devices and network connections. The computing device can then transmit, to the user device, the data segment at the determined bitrate. The computing device can also transmit, to the user device, another data segment at the determined bitrate for which a request has yet to be received using a server push.

The computing device can determine a projected period of increased network usage. For example, the computing device can determine the projected period of increased network usage based on previously aggregated network heuristics. The computing device can determine a bitrate for transmitting data segments to the user device based on the projected period of increased network usage. During the projected period of increased network usage, the computing device can transmit the data segment corresponding to the determined bitrate.

The user device can receive the data segment from the computing device in response to a request for the data segment specifying a first bitrate. The data segment can be received at a second bitrate, different from or same as the first bitrate, as determined by the computing device. The user device can also receive another (unrequested) data segment from the computing device via a server push and store the another data segment in a cache. If user device generates a request for the another data segment the user device can load the another data segment from the cache, rather than transmitting the request to the computing device.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, show examples and together with the description, serve to explain the principles of the methods and systems.

DETAILED DESCRIPTION

Figure 1:
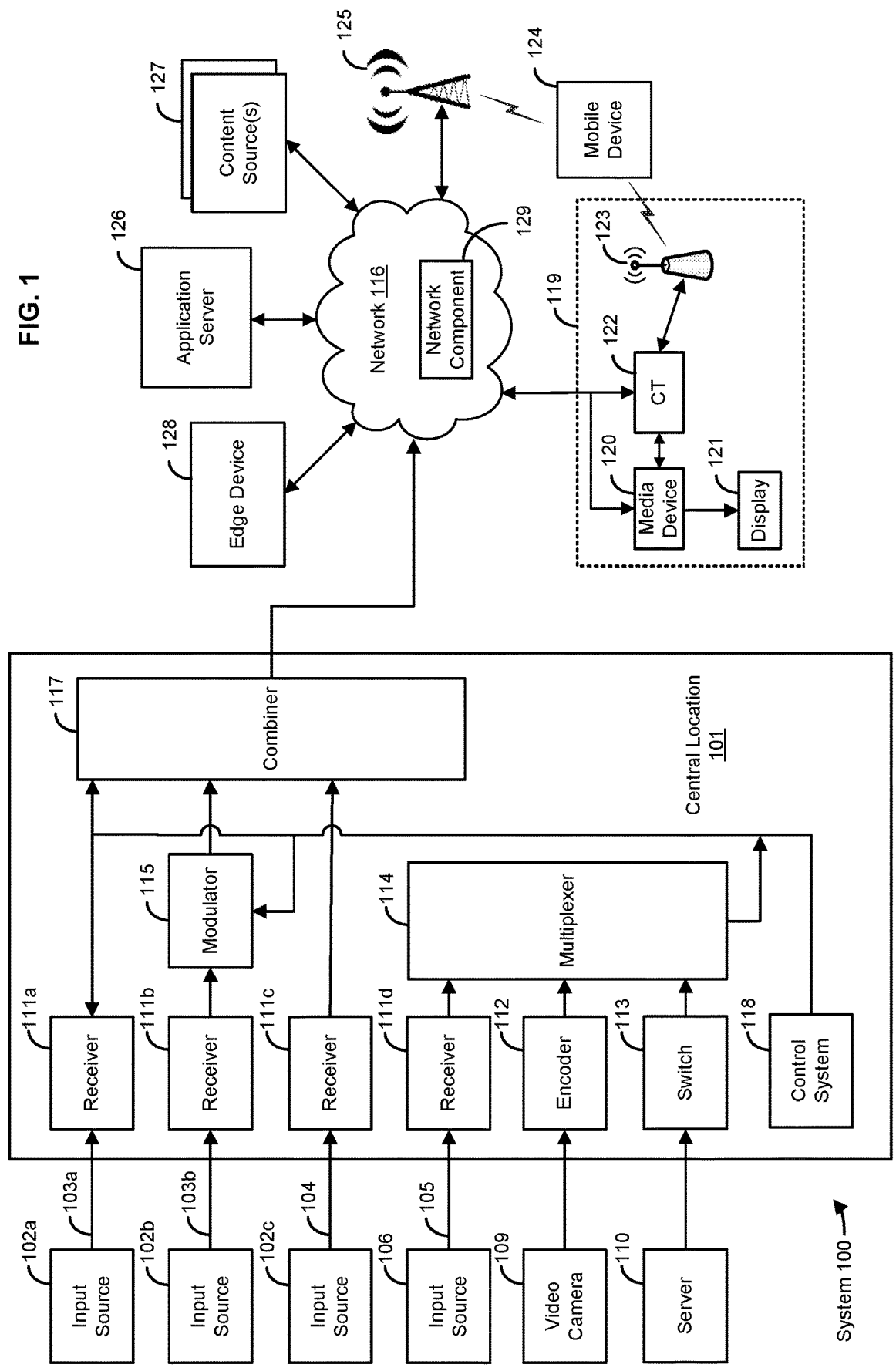
FIG. 1 is a diagram of an example content delivery network.

Before the present methods and systems are disclosed and described, it is to be understood that the methods and systems are not limited to specific methods, specific components, or to particular implementations. It is also to be understood that the terminology used herein is for the purpose of describing particular examples only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another example includes from the one particular value and/or to the other particular value. Similarly, when values are expressed as approximations, by use of the antecedent "about," it will be understood that the particular value forms another example. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal example. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all examples of this application including, but not limited to, steps in disclosed methods. Thus, if there are a variety of additional steps that can be performed it is understood that each of these additional steps can be performed with any specific example or combination of examples of the disclosed methods.

The present methods and systems may be understood more readily by reference to the following detailed description of the examples included therein and to the Figures and their previous and following description.

As will be appreciated by one skilled in the art, the methods and systems may take the form of an entirely hardware example, an entirely software example, or an example combining software and hardware examples. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Examples of the methods and systems are described below with reference to block diagrams and flowcharts of methods, systems, apparatuses and computer program products. It will be understood that each block of the block diagrams and flowcharts, and combinations of blocks in the block diagrams and flowcharts, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowcharts support combinations of means for performing the specified functions, combinations of steps for performing the specified functions and program instruction means for performing the specified functions. It will also be understood that each block of the block diagrams and flowcharts, and combinations of blocks in the block diagrams and flowcharts, can be implemented by special purpose hardware-based computer systems that perform the specified functions or steps, or combinations of special purpose hardware and computer instructions.

In various instances, this detailed description may refer to content items (which may also be referred to as "content," "content data," "content information," "content asset," "multimedia asset data file," or simply "data" or "information"). In some instances, content items can comprise any information or data that may be licensed to one or more individuals (or other entities, such as business or group). In various examples, content may include electronic representations of video, audio, text and/or graphics, which may include but is not limited to electronic representations of videos, movies, or other multimedia, which may include but is not limited to data files adhering to MPEG2, MPEG, MPEG4 UHD, HDR, 4k, Adobe® Flash® Video (.FLV) format or some other video file format whether such format is presently known or developed in the future. In various examples, the content items described herein may include electronic representations of music, spoken words, or other audio, which may include but is not limited to data files adhering to the MPEG-1 Audio Layer 3 (.MP3) format, Adobe®, CableLabs 1.0, 1.1, 3.0, AVC, HEVC, H.264, Nielsen watermarks, V-chip data and Secondary Audio Programs (SAP). Sound Document (.ASND) format or some other format configured to store electronic audio whether such format is presently known or developed in the future. In some cases, content may include data files adhering to the following formats: Portable Document Format (.PDF), Electronic Publication (.EPUB) format created by the International Digital Publishing Forum (IDPF), JPEG (.JPG) format, Portable Network Graphics (.PNG) format, dynamic ad insertion data (.csv), Adobe® Photoshop® (.PSD) format or some other format for electronically storing text, graphics and/or other information whether such format is presently known or developed in the future. In some examples, content items may include any combination of the above-described examples.

In various instances, this detailed disclosure may refer to consuming content or to the consumption of content, which may also be referred to as "accessing" content, "providing" content, "viewing" content, "listening" to content, "rendering" content, or "playing" content, among other things. In some cases, the particular term utilized may be dependent on the context in which it is used. For example, consuming video may also be referred to as viewing or playing the video. In another example, consuming audio may also be referred to as listening to or playing the audio.

Note that in various instances this detailed disclosure may refer to a given entity performing some action. It should be understood that this language may in some cases mean that a system (e.g., a computer) owned and/or controlled by the given entity is actually performing the action.

The present disclosure relates to an approach for server-selected bitrate content streaming.

The disclosed systems and methods set forth an approach for server-selected bitrate streaming whereby a server determines a bitrate for a data segment transmitted to a user device. A user device can receive a manifest having a single network address to which requests are transmitted (e.g., a server). Thus, the user device can be deprived of choice as to which network address requests for data segments will be transmitted. In response to a request for a data segment from the user device, the server will determine a bitrate for the data segment to be transmitted. The server can access network heuristics to determine a bitrate for the data segment. Network heuristics can include network heuristics relative to the user device transmitting the request, such as a roundtrip time to the user device from the server. Network heuristics can also include network heuristics relative to other user devices or network connections, including overall available network resources, projected available network resources, or other network heuristics. If the request for the data segment identifies a bitrate for the data segment, the server can determine the bitrate at which the data segment will be transmitted as a function of the bitrate identified in the request. The bitrate of the data segment to be transmitted may or may not match the bitrate identified in the request for the data segment.

The data segment can be requested according to a naming convention. For example, the user device can request a data segment that includes, in a file name or other identifier, a segment identifier, a bitrate identifier, or other identifying information. The data segment can encode or transform identifiers or names of the data segment to match that which are requested by the user device. Thus, the user device treats the data segment received from the server as if it is identical to what was requested, even if the bitrate of the received data segment differs from the bitrate at which the data segment was requested.

Given that the server has received the request for the data segment, the server can anticipate which data segment will be requested next by the user device. For example, as data segments of a content stream can conform to a known sequential order, a server knowing a last requested data segment can anticipate that the user device will transmit a request for a sequentially next data segment. Thus, using a server push, the server can proactively transmit the sequentially next data segment(s) to the user device before a request for the sequentially next data segment(s) has been received. The server push can include, for example, a Hyper Text Transfer Protocol 2.0 (HTTP 2.0) server push, or other server push as can be appreciated. The server can transmit the sequentially next data segment(s) using the previously determined bitrate, or by re-determining the bitrate as described above. As network heuristics change, the server can re-determine at what bitrate data segments will be transmitted. The server pushed sequentially next data segment(s) can be stored in a cache of the user device. Thus, if an application on the user device generates a request for the sequentially next data segment, the requested data segment can be loaded from the cache, saving a roundtrip time to the server.

As all requests from the user device are transmitted to a same network address for a given content item, the user device can maintain a same network connection to the server for transmitting requests and receiving data segments. For example, the user device can maintain a single Transmission Control Protocol (TCP) connection to the server. Maintaining the same network connection to the server eliminates the overhead required in repeatedly opening and closing TCP connections each time a data segment is requested and received. Moreover, in systems in which network connections are limited, it reduces competition for a limited pool of available network connections.

The server can determine a projected period of increased network activity. For example, the server can identify a previous period of increased network activity as a period during which one or more network heuristics meet or exceed a threshold. Such a network heuristics can include an average or maximum roundtrip time between the server and one or more user devices, a number of network connections, an amount of bandwidth usage, or other heuristics. The projected period of increased network activity can then be determined as corresponding to the previous period of increased network activity. For example, if a previous period of increased network activity corresponds to the broadcast or transmission of a particular program or event, a subsequent broadcast of the program or event, or a related program or event, can be determined as the projected period of increased network activity.

The server can determine a bitrate for transmitting data segments during the projected period of increased network activity. For example, the determined bitrate can include a maximum or a threshold bitrate. As another example, the determined bitrate can include a predefined bitrate. Thus, during the projected period of increased network activity, the server can transmit data segments at the determined bitrate to user devices.

FIG. 1 shows an exemplary system in which the present methods and systems can operate. Those skilled in the art will appreciate that present methods may be used in systems that employ both digital and analog equipment. One skilled in the art will appreciate that provided herein is a functional description and that the respective functions can be performed by software, hardware, or a combination of software and hardware.

A system 100 can comprise a central location 101 (e.g., a headend), which can receive content (e.g., data, input programming, and the like) from multiple sources. The central location 101 can combine the content from the various sources and can distribute the content to user (e.g., subscriber) locations (e.g., location 119) via a distribution system 116.

The central location 101 can receive content from a variety of sources 102*a*, 102*b*, 102*c*. The content can be transmitted from the source to the central location 101 via a variety of transmission paths, including wireless (e.g. satellite paths 103*a*, 103*b*) and a terrestrial path 104. The central location 101 can also receive content from a direct feed source 106 via a direct line 105. Other input sources can comprise capture devices such as a video camera 109 or a server 110. The signals provided by the content sources can include a single content item or a multiplex that includes several content items.

The central location 101 can comprise one or a plurality of receivers 111*a*, 111*b*, 111*c*, 111*d* that are each associated with an input source. For example, MPEG encoders such as an encoder 112, are included for encoding local content or a video camera 109 feed. A switch 113 can provide access to the server 110, which can be a Pay-Per-View server, a data server, an internet router, a network system, a phone system, and the like. Some signals may require additional processing, such as signal multiplexing, prior to being modulated. Such multiplexing can be performed by a multiplexer (mux) 114.

The central location 101 can comprise one or a plurality of modulators 115 for interfacing to a network 116. The modulators 115 can convert the received content into a modulated output signal suitable for transmission over a network 116. The output signals from the modulators 115 can be combined, using equipment such as a combiner 117, for input into the network 116. The network 116 can comprise a content delivery network, a content access network, and/or the like. For example, the network 116 can be configured to provide content from a variety of sources using a variety of network paths, protocols, devices, and/or the like. The content delivery network and/or content access network can be managed (e.g., deployed, serviced) by a content provider, a service provider, and/or the like.

A control system 118 can permit a system operator to control and monitor the functions and performance of the system 100. The control system 118 can interface, monitor, and/or control a variety of functions, including, but not limited to, the channel lineup for the television system, billing for each user, conditional access for content distributed to users, and the like. The control system 118 can provide input to the modulators for setting operating parameters, such as system specific MPEG table packet organization or conditional access information. The control system 118 can be located at the central location 101 or at a remote location.

The network 116 can distribute signals from the central location 101 to user locations, such as a user location 119. The network 116 can comprise an optical fiber network, a coaxial cable network, a hybrid fiber-coaxial network, a wireless network, a satellite system, a direct broadcast system, an Ethernet network, a high-definition multimedia interface network, universal serial bus network, or any combination thereof.

A multitude of users can be connected to the network 116 at one or more of the user locations. At the user location 119, a media device 120 can demodulate and/or decode, if needed, the signals for display on a display device 121, such as on a television set (TV) or a computer monitor. For example, the media device 120 can comprise a demodulator, decoder, frequency tuner, and/or the like. The media device 120 can be directly connected to the network (e.g., for communications via in-band and/or out-of-band signals of a content delivery network) and/or connected to the network 116 via a communication terminal 122 (e.g., for communications via a packet switched network). The media device 120 can comprise a set-top box, a digital streaming device, a gaming device, a media storage device, a digital recording device, a combination thereof, and/or the like. The media device 120 can comprise one or more applications, such as content viewers, social media applications, news applications, gaming applications, content stores, electronic program guides, and/or the like. Those skilled in the art will appreciate that the signal can be demodulated and/or decoded in a variety of equipment, including the communication terminal 122, a computer, a TV, a monitor, or satellite dish.

The communication terminal 122 can be located at the user location 119. The communication terminal 122 can be configured to communicate with the network 116. The communications terminal 122 can comprise a modem (e.g., cable modem), a router, a gateway, a switch, a network terminal (e.g., optical network unit), and/or the like. The communications terminal 122 can be configured for communication with the network 116 via a variety of protocols, such as internet protocol, transmission control protocol, file transfer protocol, session initiation protocol, voice over internet protocol, and/or the like. For example, for a cable network, the communication terminal 122 can be configured to provide network access via a variety of communication protocols and standards, such as Data Over Cable Service Interface Specification.

The user location 119 can comprise a first access point 123, such as a wireless access point. The first access point 123 can be configured to provide one or more wireless networks in at least a portion of the user location 119. The first access point 123 can be configured to provide access to the network 116 to devices configured with a compatible wireless radio, such as a mobile device 124, the media device 120, the display device 121, or other computing devices (e.g., laptops, sensor devices, security devices). For example, the first access point 123 can provide a user managed network (e.g., local area network), a service provider managed network (e.g., public network for users of the service provider), and/or the like. It should be noted that in some configurations, some or all of the first access point 123, the communication terminal 122, the media device 120, and the display device 121 can be implemented as a single device.

The user location 119 may not be fixed. By way of example, a user can receive content from the network 116 on the mobile device 124. The mobile device 124 can comprise a laptop computer, a tablet device, a computer station, a personal data assistant (PDA), a smart device (e.g., smart phone, smart apparel, smart watch, smart glasses), GPS, a vehicle entertainment system, a portable media player, a combination thereof, and/or the like. The mobile device 124 can communicate with a variety of access points (e.g., at different times and locations or simultaneously if within range of multiple access points). For example, the mobile device 124 can communicate with a second access point 125. The second access point 125 can be a cell tower, a wireless hotspot, another mobile device, and/or other remote access point. The second access point 125 can be within range of the user location 119 or remote from the user location 119. For example, the second access point 125 can be located along a travel route, within a business or residence, or other useful locations (e.g., travel stop, city center, park).

The system 100 can comprise an application device 126. The application device 126 can be a computing device, such as a server. The application device 126 can provide services related to applications. For example, the application device 126 can comprise an application store. The application store can be configured to allow users to purchase, download, install, upgrade, and/or otherwise manage applications. For example, the application device 126 can be configured to allow users to download applications to a device, such as the mobile device 124, communications terminal 122, the media device 120, the display device 121, and/or the like. The application device 126 can run one or more application services to provide data, handle requests, and/or otherwise facilitate operation of applications for the user.

The system 100 can comprise one or more content source (s) 127. The content source(s) 127 can be configured to provide content (e.g., video, audio, games, applications, data) to the user. The content source(s) 127 can be configured to provide streaming media, such as on-demand content (e.g., video on-demand), content recordings, and/or the like. For example, the content source(s) 127 can be managed by third party content providers, service providers, online content providers, over-the-top content providers, and/or the like. The content can be provided via a subscription, by individual item purchase or rental, and/or the like. The content source(s) 127 can be configured to provide the content via a packet switched network path, such as via an internet protocol (IP) based connection. The content can be accessed by users via applications, such as mobile applications, television applications, set-top box applications, gaming device applications, and/or the like. An example application can be a custom application (e.g., by content provider, for a specific device), a general content browser (e.g., web browser), an electronic program guide, and/or the like.

The system 100 can comprise an edge device 128. The edge device 128 can be configured to provide content, services, and/or the like to the user location 119. For example, the edge device 128 can be one of a plurality of edge devices distributed across the network 116. The edge device 128 can be located in a region proximate to the user location 119. A request for content from the user can be directed to the edge device 128 (e.g., due to the location of the edge device and/or network conditions). The edge device 128 can be configured to package content for delivery to the user (e.g., in a specific format requested by a user device), provide the user a manifest file (e.g., or other index file describing segments of the content), provide streaming content (e.g., unicast, multicast), provide a file transfer, and/or the like. The edge device 128 can cache or otherwise store content (e.g., frequently requested content) to enable faster delivery of content to users.

The network 116 can comprise a network component 129. The network component 129 can comprise any device, module, and/or the like communicatively coupled to the network 116. For example, the network component 129 can comprise a router, a switch, a splitter, a packager, a gateway, a encoder, a storage device, a multiplexer, a network access location (e.g., tap), physical link, and/or the like.

In an exemplary example, the methods and systems disclosed can be located within the application server 126, the content source 127, and/or the edge device 128. For example, any of the application server 126, the content source 127, or the edge device 128 may serve as a server relative to a user device, such as the media device 120 and/or the mobile device 124, and implement the server-side selection of bitrates of data segments, as well as transmit data segments to user devices. For example, a user device (e.g., the media device 120 and/or the mobile device 124) can transmit a request to a server (e.g., the application server 126, the content source 127, and/or the edge device 128). The request can facilitate initiation of a stream of data segments to the user device. In response to this request, the application server 126, the content source 127, and/or the edge device 128 can transmit a manifest to the user device. The manifest can contain a single network address, such as a uniform resource locator (URL) to which requests for data segments will be transmitted, regardless of what bitrate at which the data segments are requested, if any. The user device can then generate a request for at least one data segment and can transmit the request to the network address included in the manifest. In response to the request, the application server 126, the content source 127, and/or the edge device 128 can determine a bitrate for the requested at least one data segment to be transmitted to the user device.

The bitrate for the requested at least one data segment can be determined based on one or more network heuristics. For example, the one or more network heuristics can include one or more roundtrip times the between the application server 126, the content source 127, and/or the edge device 128, and one or more media devices 120 and/or mobile devices 124. As another example, the one or more network heuristics can include a number of network connections open on the application server 126, the content source 127, and/or the edge device 128. As a further example, the one or more network heuristics can include bandwidth measurements for the application server 126, the content source 127, the edge device 128, the media device 120 and/or the mobile device 124. Such bandwidth measurements can include a current available bandwidth, a minimum bandwidth, a maximum bandwidth, an average bandwidth over time, or another bandwidth measurements. The one or more network heuristics can also include server capacity measurements for the application server 126, the content source 127, and/or the edge device 128. The network heuristics can be relative to the user device from which the request for the at least one content segment was received. The network heuristics can be relative to other user devices. The network heuristics can be aggregate values representing one or more user devices, one or more network connections, one or more servers, or other components of the content delivery network.

The application server 126, the content source 127, and/or the edge device 128 can then transmit the requested at least one data segment to the requesting media device 120 and/or the mobile device 124. The requested at least one data segment can be named or otherwise modified to conform to a name or other identifier provided in the request for the at least one data segment. For example, at the application server 126, the content source 127, and/or the edge device 128, versions of the at least one data segment of varying bitrates can be stored with file names or identifiers indicating their respective bitrate. For example, versions of a data segment at index N can be named as "content_N_2500.ts," "content_N_5000.ts," and "content_N_8000.ts," encoded at 2500 kbps, 5000 kbps, or 8000 kbps, respectively.

The request might not identify a bitrate for the at least one data segment. The application server 126, the content source 127, and/or the edge device 128 can rename or modify an instance of the at least one data segment transmitted in response to the request to have a name or identifier omitting the bitrate, thereby matching the request. The request might identify a bitrate for the at least one data segment, but the at least one data segment selected for transmission may be encoded, and therefore named, according to a different bitrate. The application server 126, the content source 127, and/or the edge device 128 can rename or modify an instance of the at least one data segment transmitted in response to the request to have a name or identifier indicating the bitrate as requested, but not necessarily as transmitted, thereby matching the request.

After transmitting the requested at least one data segment, the application server 126, the content source 127, and/or the edge device 128 can select another at least one data segment for transmission to the media device 120 and/or the mobile device 124. For example, if a content item is encoded as a sequence of data segments, the sequentially next at least one data segment relative to the requested at least one data segment can be selected for transmission. The application server 126, the content source 127, and/or the edge device 128 can then transmit the another at least one data segment to the media device 120 and/or the mobile device 124 using a server push, such as an HTTP 2.0 server push, and stored in a cache of the media device 120 and/or the mobile device 124. A server push can be necessary to transmit the other at least one data segment as it has yet to be requested by the media device 120 and/or the mobile device 124. If the media device 120 and/or the mobile device 124 generates a request for the another at least one data segment, the another at least one data segment can be loaded from the cache as the another at least one data segment is already stored due to the server push. This saves on a roundtrip time between the application server 126, the content source 127, and/or the edge device 128 and the media device 120 and/or the mobile device 124 in order for the media device 120 and/or the mobile device 124 to receive the another at least one data segment.

The application server 126, the content source 127, and/or the edge device 128 can continue to select and transmit data segments to the media device 120 and/or the mobile device 124 at bitrates determined according to current or changes in the network heuristics. If another request for at least one data segment is received by the application server 126, the content source 127, and/or the edge device 128, indicating that these requested at least one data segments had not been pushed to and stored in the device cache of the media device 120 and/or the mobile device 124, the application server 126, the content source 127, and/or the edge device 128 can respond by transmitting these requested at least one data segments to the media device 120 and/or the mobile device 124. The application server 126, the content source 127, and/or the edge device 128 can then resume transmission of sequentially next data segments relative to the last transmitted (e.g., the last requested) at least one data segment to the media device 120 and/or the mobile device 124 via the server push.

Figure 2:
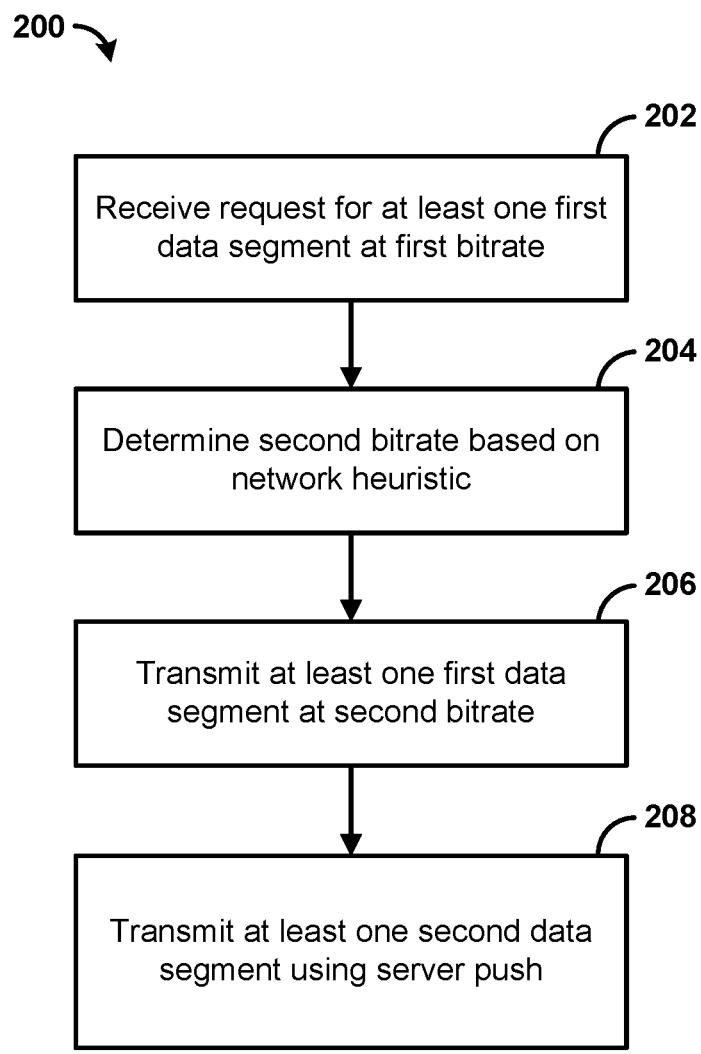
FIG. 2 is a flowchart of an example method.

FIG. 2 is a flowchart of an example method 200. Beginning with step 202, a computing device such as a server (e.g., the application server 126, the content source 127, and/or the edge device 128 of FIG. 1) can receive a request, from a user device (e.g., the media device 120 and/or the mobile device 124 of FIG. 1) for at least one first data segment at a first bitrate. The computing device can facilitate a stream or other transmission of data segments to the user device. For example, the computing device can facilitate a media stream of a content item to the user device. Accordingly, the content item can be encoded into a plurality of versions at different bitrates, with each of the versions of the content item being encoded as a plurality of data segments. Thus, the request from the user device can identify a particular at least one first data segment for the content item (e.g., a time code, time period, or duration of the content item), and identify a bitrate of the version of the content item from which the requested at least one first data segment should be selected. The request can be received through a network connection between the computing device and the user device. The network connection can include a Transmission Control Protocol (TCP) connection, or another connection.

Next, in step 204, the computing device can determine a second bitrate for the at least one first data segment based on one or more network heuristics. The network heuristics can include a roundtrip time between the user device and the computing device through the network. The network heuristics can include an interval at which requests are received from the user device. The network heuristics can include an upload or download speed relative to the user device. The network heuristics can include an amount of server capacity of the computing device. The network heuristics can include an amount of available bandwidth of the computing device or the user device. The network heuristics can include a number of open network connections of the computing device or the user device.

The network heuristics can include an average, minimum, maximum, or other aggregate value of the aforementioned network heuristics relative to a plurality of user devices. For example, the network heuristics can include an aggregate roundtrip time, an aggregate interval at which requests are received from the plurality of user devices, or an aggregate upload or download speed of the plurality of user devices. The computing device can determine the second bitrate as a function of the first bitrate indicated in the request from the user device. For example, the computing device can determine the second bitrate by increasing or decreasing the first bitrate based on the network heuristics. The computing device can determine the second bitrate independent of the first bitrate. The computing device can determine the second bitrate to be equal to the first bitrate. The computing device can determine the second bitrate to be different from the first bitrate.

Next, at step 206, the computing device can transmit the requested at least one first data segment at the second bitrate to the user device. If the request for the at least one first data segment was received through a network connection to the user device, such as a TCP connection, the at least one first data segment can be transmitted through the same network connection. Transmitting the requested at least one first data segment to the user device can include renaming or otherwise modifying an identifier of an instance of the requested at least one first data segment to be transmitted in order to match the request. A data segment can be stored with a file name identifying the data segment and the bitrate at which it is encoded.

For example, assume a content item is encoded into three versions of differing bitrates: 350 kilobits per second (kbps), 700 kbps, and 1400 kbps. For such a content item, a given data segment can be stored using the naming convention "content_INDEX_BITRATE," with INDEX being replaced by the index of the data segment and BITRATE being replaced by the respective bitrate in kbps. Thus, a user device requesting the first data segment (index 0) of a content item at 700 kbps can transmit a request to the computing device for "content_0_700." Using this example, assume that the computing device can determine that the requested data segment should be transmitted at 350 kbps. The computing device can load the "content_0_350" data segment, and rename the loaded instance of the data segment to "content_0_700" before transmission to the user device. By renaming the loaded instance of the data segment, not the stored version, it prevents permanent modification to the stored data segment. Moreover, by renaming the data segment, the user device would operate as if it received the data segment at the requested bitrate, even though the user device received the data segment at a bitrate different than what was requested.

The request for at least one data segment can indicate the first bitrate in a field or header of the request other than the file name. In such an example, the request can indicate the at least one data segment requested using a bitrate-independent naming convention (e.g. "content_N.ts"). In such an example, the computing device can rename a loaded instance of a data segment to the bitrate-independent naming convention before transmission to the user device. For example, the request can identify "content_N.ts" as the file name of a requested data segment, and indicate "5000" as the first bitrate (in kbps). The computing device can then load the requested data segment "content_N_5000.ts." Here, the file name "content_N_5000.ts" identifies the first bitrate. The computing device can rename "content_N_5000.ts" to "content_N.ts" before transmission to the user device. Thus, the computing device receives the requested data segment having the file name matching the file name included the request.

Next, at step 208, the computing device can transmit at least one second data segment using a server push. The server push can include a Hypertext Transfer Protocol (HTTP) 2.0 server push, or another server push as can be appreciated. The computing device can transmit the at least one second data segment at the previously determined second bitrate. The computing device can determine a third bitrate at which the at least one second data segment is transmitted, thereby reflecting any changes in network conditions or network heuristics. The computing device can transmit the at least one second data segment using a same network connection to the user device as was used to transmit the at least one first data segment to the user device. The same network connection can include a same TCP connection. The computing device can select the at least one second data segment as a sequentially next at least one data segment relative to the at least one first data segment. Thus, a user device requesting data segments in sequence would generate a request for the at least one second data segment after it has been pushed to the user device. The user device can then load the at least one second data segment from a device cache in response to the request for the at least one second data segment, thereby saving a roundtrip time to the computing device in order to receive the at least one data segment.

Figure 3:
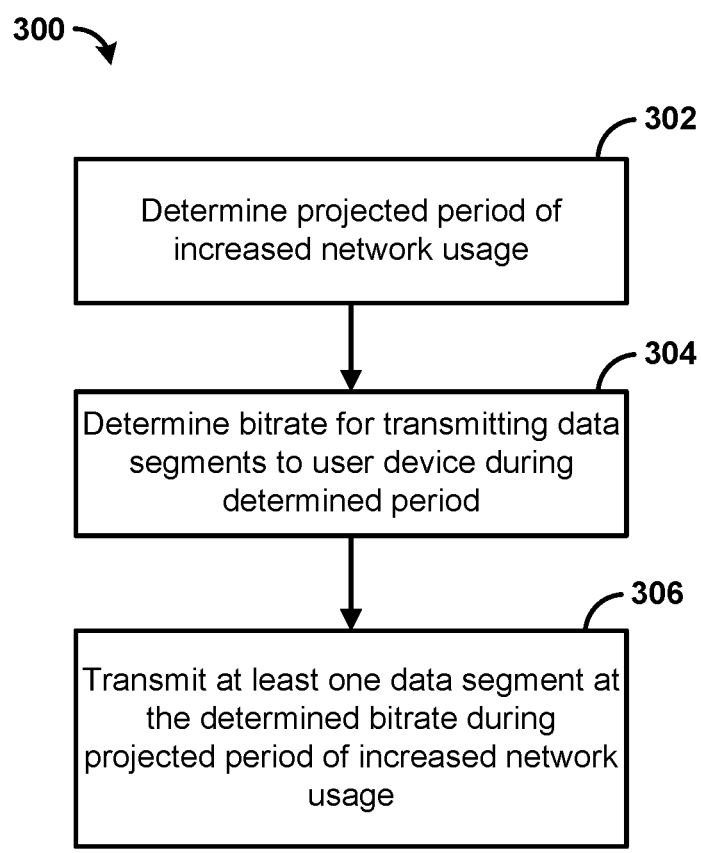
FIG. 3 is a flowchart of an example method.

FIG. 3 is a flowchart of an example method 300. Beginning with step 302, a computing device such as a server (e.g., the application server 126, the content source 127, and/or the edge device 128 of FIG. 1) can determine a period of increased network usage. Determining the period of increased network usage can include determining a past period of increased network usage. A period of increased network usage can comprise a period during which one or more network heuristics meet, exceed, or fall below a predefined threshold.

The network heuristics can include a roundtrip time between the user device and the computing device through the network. The network heuristics can include an interval at which requests are received from the user device. The network heuristics can include an upload or download speed relative to the user device. The network heuristics can include an amount of server capacity of the computing device. The network heuristics can include an amount of available bandwidth of the computing device or the user device. The network heuristics can include a number of open network connections of the computing device or the user device.

The network heuristics can include an average, minimum, maximum, or other aggregate value of the aforementioned network heuristics relative to a plurality of user devices. For example, the network heuristics can include an aggregate roundtrip time, an aggregate interval at which requests are received from the plurality of user devices, or an aggregate upload or download speed of the plurality of user devices.

The predefined threshold can be defined as a percentage of a known or estimated value for the network heuristics. For example, a server can have an estimated 15000 maximum users at a time, and the threshold can be defined as ninety percent of that (13500 users). Thus, the period of increased network usage can be determined as a period during which the number of users connected to the server meets or exceeds 13500. As another example, a server can have a network connection with 100 gigabits per second (Gbps) of bandwidth available, with the threshold defined as 95 percent of the bandwidth (95 Gbps). Thus, the period of increased network usage can be determined as a period during which an amount of bandwidth used meets or exceeds 95 Gbps. The predefined threshold can also be defined as a value independent of any known or estimated value.

Based on the past period of increased network usage, the computing device can determine the projected period of increased network usage as a future period corresponding to the past period of increased network usage. For example, for a past period of increased network usage corresponding to a day of the week and/or time, the projected period of increased network usage can include a following occurrence of the day of the week and/or time. As another example, for a past period of increased network usage corresponding to an event or program airing, the projected period of increased network usage can include a subsequent occurrence of the event or program broadcast, or an occurrence of a related event or program broadcast. For example, a past period of increased network usage can correspond to a sporting event. Determining the projected period of increased network usage can include identifying one or more future sporting events sharing one or more characteristics as the sporting event. Such characteristics could include a same team, a same series of events, or another characteristic. As another example, a past period of increased network usage can correspond to an airing of an episode of a television show. Determining the projected period of increased network usage can include identifying one or more future airings of the episode, or another episode in the same television show. For example, if the episode corresponding to the past period of increased network usage was a first airing of the episode, the projected period of increased network usage can be determined as a scheduled first airing of a future episode in the same television show, while reruns of episodes from the television show may or may not be determined as projected periods of increased network usage.

A projected period of increased network usage can be determined by a user definition or user input of the projected period of increased network usage. For example, a user can define one or more time periods (e.g. start times, end times, recurrence patterns, etc.) for the projected period of increased network usage, allowing for a manual definition of projected periods of increased network usage.

In step 304, the computing device can determine a bitrate to be used for transmitting data segments to a user device during the projected increased network usage. The bitrate can be determined as a function of a projected number of network connections, a projected number of served user devices, or other resources used during the projected period of increased network usage. The bitrate can be determined as a function of a resource threshold for a number of user devices accessing a particular resource. For example, given a bandwidth threshold, the bitrate can be determined as a function of the bandwidth threshold divided by a projected number of user devices accessing available bandwidth during the projected period of increased network usage. As a further example, the bitrate can be determined as a function of the bandwidth threshold divided by a maximum number of network connections supported by the server. As further example, given a threshold of computational resources allocated for data segment transmission (e.g. resources required for data segment transcoding, input/output operations, data storage or loading operations, etc.), the bitrate can be determined as a function of the allocated resources divided by an estimated amount of resources per user devices accessing data segments at a given bitrate.

During the projected period of increased network usage, in step 306, the computing device can transmit at least one data segment to a user device at the determined bitrate. Transmitting the at least one data segment to the user device at the determined bitrate can include transmitting the at least one data segment to the user device in response to a request for the at least one data segment. The request can indicate a requested bitrate for the at least one data segment. The computing device can transmit the at least one data segment at a bitrate distinct from the requested bitrate. The request can request the at least one data segment without indicating a requested bitrate.

Transmitting the at least one data segment to the user device can include renaming the at least one data segment prior to transmission to the user device. For example, the at least one data segment can be renamed to conform to a file name included in a request from the user device for the at least one data segment. Renaming the at least one data segment can include renaming the at least one data segment to a bitrate-independent naming convention, or modifying a portion of a file name of the at least one data segment indicating the bitrate of the at least one data segment. The computing device can transmit the at least one data segment to the user device using a server push. The computing device can transmit the at least one data segment via a network connection maintained with the user device, such as a Transmission Control Protocol (TCP) connection.

Figure 4:
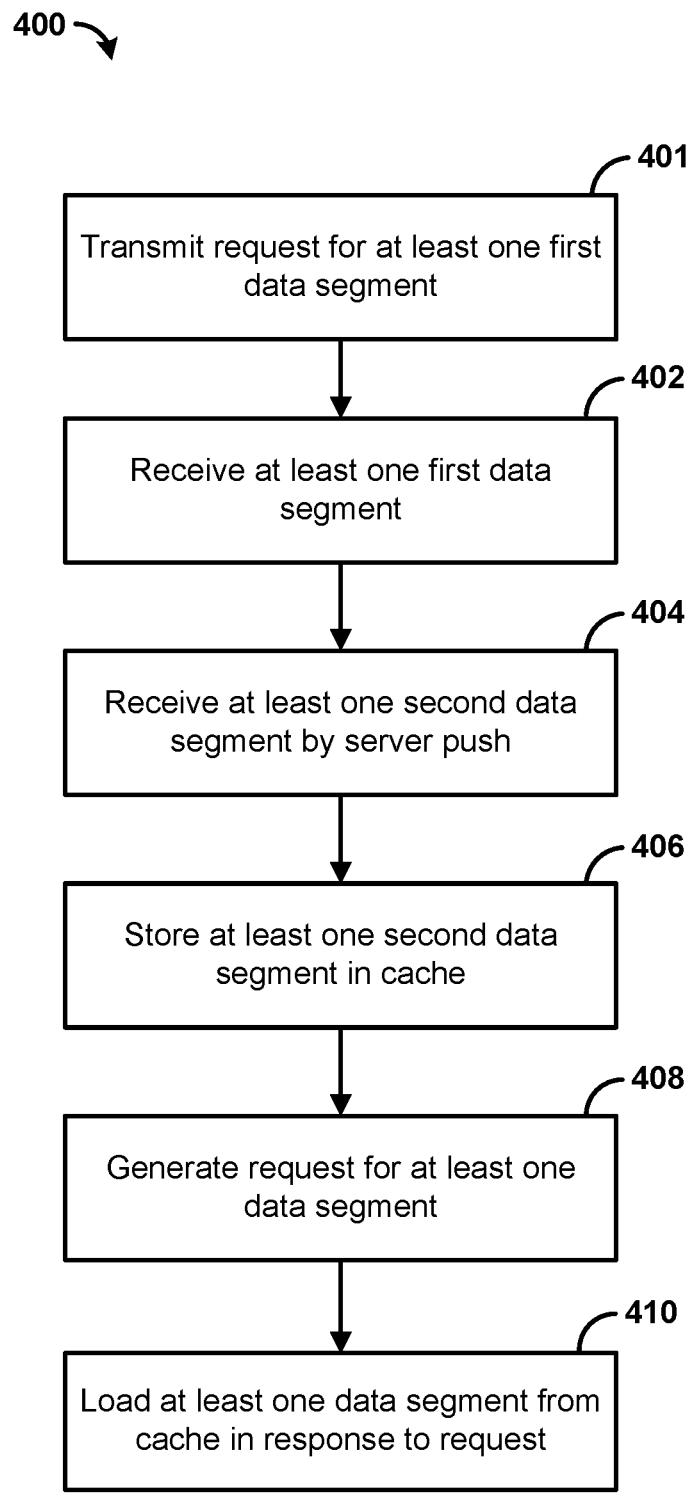
FIG. 4 is a flowchart of an example method.

FIG. 4 is a flowchart of an example method 400. Beginning with step 401, a user device (e.g., the media device 120 and/or the mobile device 124 of FIG. 1) can transmit a request for at least one first data segment to a computing device, such as a server (e.g., the application server 126, the content source 127, and/or the edge device 128 of FIG. 1). The user device can transmit the request by opening a network connection such as a Transmission Control Protocol (TCP) connection to the computing device. Transmitting the request to the computing device can include transmitting the request to a network address such as a Uniform Resource Locator (URL) encoded in a manifest. The manifest can include a single network address to which requests can be transmitted. This is distinct from approaches to variable bitrate streaming where each bitrate version of a content item corresponds to a different network address, whereby a request for data segments at a particular bitrate are sent to the corresponding network address. In contrast, by limiting the manifest to including a single network address, all requests for data segments of a content item corresponding to the manifest are transmitted to the same network address, regardless of the bitrate indicated in the request, if any. Moreover, as all requests are transmitted to the single network address, the user device can maintain a network connection to the single network address. This is distinct from approaches to variable bitrate streaming using multiple network addresses, whereby a network connection can be opened before transmission of a request and closed after receiving the response. Transmitting the request to the computing device can include generating the request to indicate a bitrate for the at least one first data segment. The bitrate indicated in the request can correspond to a bitrate indicated in the manifest for the single network address. However, the bitrate indicated in the manifest may not be indicative of the bitrate at which the at least one first data segment will be received, as described below.

In step 402, the user device can receive the at least one first data segment from the computing device in response to the request. The at least one first data segment can be encoded in the bitrate indicated in the request. The at least one first data segment can be encoded in a bitrate different from the bitrate indicated in the request. The at least one first data segment can be renamed or otherwise modified by the computing device to include identifying information matching the requested bitrate while being encoded in the distinct bitrate. For example, the at least one first data segment can have a file name or metadata modified to indicate the requested bitrate. As another example, the at least one first data segment can have a file name or metadata modified to a format independent of or omitting bitrate identifying information. Thus, the user device would treat the received at least one data segment as satisfying the request despite being encoded at a bitrate other than that which was requested.

In step 404, the user device can receive at least one second data segment from the computing device by a server push. The server push can include a Hypertext Transfer Protocol (HTTP) 2.0 server push. The at least one second data segment can be received via a same network connection as the at least one first data segment. The at least one second data segment can be named or have identifying information indicating the bitrate indicated in the manifest corresponding to the single network address. The at least one data segment can be named to or otherwise omit bitrate identifying information.

After receiving the at least one second data segment, in step 406, the user device can store the at least one second data segment in a device cache. In step 408, the user device can generate a request for the at least one second data segment. For example, the at least one second data segment can sequentially follow the at least one first data segment. The user device can be configured to transmit a request for the at least one second data segment after receiving the at least one first data segment, or after transmitting the request for the at least one data segment. However, as the at least one second data segment has already been received by a server push and is stored in the device cache, the generated request for the at least one second data segment will result in a cache hit. Thus, in step 410, instead of transmitting the request for the at least one second data segment to the computing device, the at least one data second data segment can be loaded from the cache in response to the request.

Figure 5:
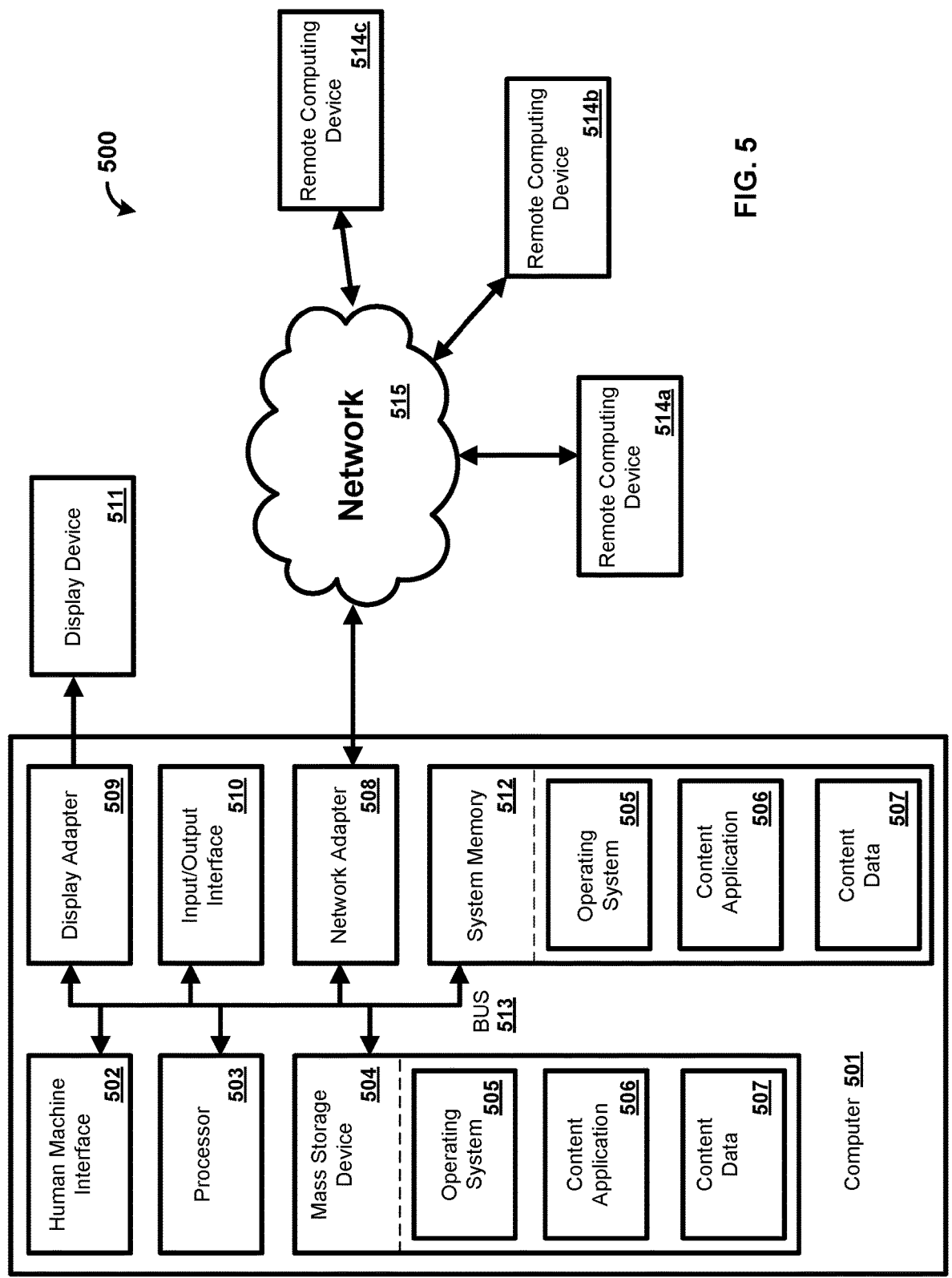
FIG. 5 is a block diagram of an example computing device.

As an example, the methods and systems can be implemented on a computer 501 as shown in FIG. 5 and described below. By way of example, the application server 126, content source 127, or edge device 128 of FIG. 1 can be a computer as shown in FIG. 5. Similarly, the methods and systems disclosed can utilize one or more computers to perform one or more functions in one or more locations. FIG. 5 is a block diagram showing an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components shown in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 501. The components of the computer 501 can comprise, but are not limited to, one or more processors 503, a system memory 512, and a system bus 513 that couples various system components including the one or more processors 503 to the system memory 512. The system can utilize parallel computing.

The system bus 513 represents one or more of several possible types of bus structures, including a memory bus or memory controller, a peripheral bus, an accelerated graphics port, or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCM-CIA), Universal Serial Bus (USB) and the like. The bus 513, and all buses specified in this description can also be implemented over a wired or wireless network connection and each of the subsystems, including the one or more processors 503, a mass storage device 504, an operating system 505, content software 506, content data 507, a network adapter 508, the system memory 512, an Input/Output Interface 510, a display adapter 509, a display device 511, and a human machine interface 502, can be contained within one or more remote computing devices 514*a,b,c* at physically separate locations, connected through buses of this form, in effect implementing a fully distributed system.

The computer 501 typically comprises a variety of computer readable media. Exemplary readable media can be any available media that is accessible by the computer 501 and comprises, for example and not meant to be limiting, both volatile and non-volatile media, removable and non-removable media. The system memory 512 comprises computer readable media in the form of volatile memory, such as random access memory (RAM), and/or non-volatile memory, such as read only memory (ROM). The system memory 512 typically contains data such as the content data 507 and/or program modules such as the operating system 505 and the content software 506 that are immediately accessible to and/or are presently operated on by the one or more processors 503.

The computer 501 can also comprise other removable/non-removable, volatile/non-volatile computer storage media. By way of example, FIG. 5 shows the mass storage device 504 which can provide non-volatile storage of computer code, computer readable instructions, data structures, program modules, and other data for the computer 501. For example and not meant to be limiting, the mass storage device 504 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 504, including by way of example, the operating system 505 and the content software 506. Each of the operating system 505 and the content software 506 (or some combination thereof) can comprise elements of the programming and the content software 506. The content data 507 can also be stored on the mass storage device 504. The content data 507 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

The user can enter commands and information into the computer 501 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the one or more processors 503 via the human machine interface 502 that is coupled to the system bus 513, but can be connected by other interface and bus structures, such as a parallel port, game port, an IEEE 1394 Port (also known as a Firewire port), a serial port, or a universal serial bus (USB).

The display device 511 can also be connected to the system bus 513 via an interface, such as the display adapter 509. It is contemplated that the computer 501 can have more than one display adapter 509 and the computer 501 can have more than one display device 511. For example, the display device 511 can be a monitor, an LCD (Liquid Crystal Display), or a projector. In addition to the display device 511, other output peripheral devices can comprise components such as speakers (not shown) and a printer (not shown) which can be connected to the computer 501 via the Input/Output Interface 510. Any step and/or result of the methods can be output in any form to an output device. Such output can be any form of visual representation, including, but not limited to, textual, graphical, animation, audio, tactile, and the like. The display device 511 and computer 501 can be part of one device, or separate devices.

The computer 501 can operate in a networked environment using logical connections to one or more remote computing devices 514*a,b,c*. By way of example, a remote computing device can be a personal computer, portable computer, smartphone, a server, a router, a network computer, a peer device or other common network node, and so on. Logical connections between the computer 501 and a remote computing device 514*a,b,c* can be made via a network 515, such as a local area network (LAN) and/or a general wide area network (WAN). Such network connections can be through the network adapter 508. The network adapter 508 can be implemented in both wired and wireless environments. Such networking environments are conventional and commonplace in dwellings, offices, enterprise-wide computer networks, intranets, and the Internet.

For exemplary purposes, application programs and other executable program components such as the operating system 505 are shown herein as discrete blocks, although it is recognized that such programs and components reside at various times in different storage components of the computing device 501, and are executed by the one or more processors 503 of the computer. An implementation of the content software 506 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the scope of the methods and systems. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with specific examples, it is not intended that the scope be limited to the particular examples set forth, as the examples herein are intended in all respects to be exemplary rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of examples described in the specification.

It will be apparent to those skilled in the art that various modifications and variations can be made without departing from the scope or spirit. Other examples will be apparent to those skilled in the art from consideration of the specification and practice disclosed herein. It is intended that the specification and examples be considered as exemplary only, with a true scope and spirit being indicated by the following claims.

What is claimed is:

1. One or more non-transitory computer-readable media storing processor-executable instructions that, when executed by at least one processor, cause the at least one processor to:
    receive a request for a portion of a content item at a first bitrate;
    determine, based on at least one network condition, a second bitrate for the portion of the content item; and
    send, to a user device, the portion of the content item at the second bitrate, wherein the portion of the content item sent at the second bitrate is identified with an identifier of the portion of the content item at the first bitrate.

2. The one or more non-transitory computer-readable media of claim 1, wherein the identifier of the portion of the content at the first bitrate comprises the first bitrate.

3. The one or more non-transitory computer-readable media of claim 1, wherein the processor-executable instructions, when executed by the at least one processor, further cause the at least one processor to:
    determine, based on the second bitrate, a second identifier of the portion of the content item at the second bitrate; and
    replace at least a portion of the second identifier with the identifier of the portion of the content item at the first bitrate.

4. The one or more non-transitory computer-readable media of claim 1, wherein the processor-executable instructions that, when executed by the at least one processor, cause the at least one processor to receive the request, cause the at least one processor to receive the request via a network address associated with the first bitrate.

5. The one or more non-transitory computer-readable media of claim 1, wherein the portion of the content item and a subsequent portion of the content item are sent via a same network connection between a computing device and the user device.

6. The one or more non-transitory computer-readable media of claim 1, wherein the at least one network condition comprises at least one of: a round-trip time between the user device and a computing device, a quantity of active network connections, a communication capacity, a projected usage during a projected period of increased network usage, or at least one bandwidth measurement.

7. The one or more non-transitory computer-readable media of claim 1, wherein the processor-executable instructions that, when executed by the at least one processor, cause the at least one processor to send the portion of the content item at the second bitrate, cause the user device to cache a subsequent portion of the content item at the second bitrate.

8. The one or more non-transitory computer-readable media of claim 1, wherein the identifier of the portion of the content item at the first bitrate is in metadata associated with the portion of the content item.

9. The one or more non-transitory computer-readable media of claim 1, wherein the request comprises a packet and wherein a name associated with the portion of the content at the first bitrate is in a first field of the packet and the first bitrate is in a second field of the packet.

10. One or more non-transitory computer-readable media storing processor-executable instructions that, when executed by at least one processor, cause the at least one processor to:
    send a request for a portion of a content item at a first bitrate; and
    receive the portion of the content item at a second bitrate, wherein the portion of the content item comprises an identifier indicating that the portion of the content item is at the first bitrate.

11. The one or more non-transitory computer-readable media of claim 10, wherein the request comprises a uniform resource locator (URL) associated with the portion of the content item and wherein the URL comprises the identifier.

12. The one or more non-transitory computer-readable media of claim 10, wherein the request comprises a packet and wherein a field of the packet comprises the identifier.

13. The one or more non-transitory computer-readable media of claim 10, wherein the portion of the content item at the second bitrate comprises metadata, wherein the metadata comprises the identifier indicating that the portion of the content item is at the first bitrate.

14. The one or more non-transitory computer-readable media of claim 10, wherein the processor-executable instructions, when executed by the at least one processor, further cause the at least one processor to receive a subsequent portion of the content item via a network connection from which the portion of the content item is received.

15. The one or more non-transitory computer-readable media of claim 10, wherein the first bitrate is associated with a first network condition and the second bitrate is associated with a second network condition.

16. An apparatus comprising:
one or more processors; and
memory storing processor-executable instructions that, when executed by the one or more processors, cause the apparatus to:
receive a request for a portion of a content item at a first bitrate;
determine, based on at least one network condition, a second bitrate for the portion of the content item; and
send, to a user device, the portion of the content item at the second bitrate, wherein the portion of the content item sent at the second bitrate is identified with an identifier of the portion of the content item at the first bitrate.

17. The apparatus of claim 16, wherein the identifier of the portion of the content at the first bitrate comprises the first bitrate.

18. The apparatus of claim 16, wherein the processor-executable instructions, when executed by the one or more processors, further cause the apparatus to:
determine, based on the second bitrate, a second identifier of the portion of the content item at the second bitrate; and
replace at least a portion of the second identifier with the identifier of the portion of the content item at the first bitrate.

19. The apparatus of claim 16, wherein the processor-executable instructions that, when executed by the one or more processors, cause the apparatus to receive the request, cause the apparatus to receive the request via a network address associated with the first bitrate.

20. The apparatus of claim 16, wherein the portion of the content item and a subsequent portion of the content item are sent via a same network connection between a computing device and the user device.

21. The apparatus of claim 16, wherein the at least one network condition comprises at least one of: a round-trip time between the user device and a computing device, a quantity of active network connections, a communication capacity, a projected usage during a projected period of increased network usage, or at least one bandwidth measurement.

22. The apparatus of claim 16, wherein the processor-executable instructions that, when executed by the one or more processors, cause the apparatus to send the portion of the content item at the second bitrate, cause the user device to cache a subsequent portion of the content item at the second bitrate.

23. The apparatus of claim 16, wherein the identifier of the portion of the content item at the first bitrate is in metadata associated with the portion of the content item.

24. The apparatus of claim 16, wherein the request comprises a packet and wherein a name associated with the portion of the content at the first bitrate is in a first field of the packet and the first bitrate is in a second field of the packet.

25. An apparatus comprising:
one or more processors; and
memory storing processor-executable instructions that, when executed by the one or more processors, cause the apparatus to:
send a request for a portion of a content item at a first bitrate; and
receive the portion of the content item at a second bitrate, wherein the portion of the content item comprises an identifier indicating that the portion of the content item is at the first bitrate.

26. The apparatus of claim 25, wherein the request comprises a uniform resource locator (URL) associated with the portion of the content item and wherein the URL comprises the identifier.

27. The apparatus of claim 25, wherein the request comprises a packet and wherein a field of the packet comprises the identifier.

28. The apparatus of claim 25, wherein the portion of the content item at the second bitrate comprises metadata, wherein the metadata comprises the identifier indicating that the portion of the content item is at the first bitrate.

29. The apparatus of claim 25, wherein the processor-executable instructions, when executed by the one or more processors, further cause the apparatus to receive a subsequent portion of the content item via a network connection from which the portion of the content item is received.

30. The apparatus of claim 25, wherein the first bitrate is associated with a first network condition and the second bitrate is associated with a second network condition.

31. A system comprising:
a computing device configured to:
receive a request for a portion of a content item at a first bitrate;
determine, based on at least one network condition, a second bitrate for the portion of the content item; and
send, to a user device, the portion of the content item at the second bitrate, wherein the portion of the content item sent at the second bitrate is identified with an identifier of the portion of the content item at the first bitrate; and
the user device configured to:
receive the portion of the content item at the second bitrate.

32. The system of claim 31, wherein the identifier of the portion of the content at the first bitrate comprises the first bitrate.

33. The system of claim 31, wherein the computing device is further configured to:
determine, based on the second bitrate, a second identifier of the portion of the content item at the second bitrate; and
replace at least a portion of the second identifier with the identifier of the portion of the content item at the first bitrate.

34. The system of claim 31, wherein to receive the request, the computing device is configured to receive the request via a network address associated with the first bitrate.

35. The system of claim 31, wherein the portion of the content item and a subsequent portion of the content item are sent via a same network connection between the computing device and the user device.

36. The system of claim 31, wherein the at least one network condition comprises at least one of: a round-trip time between the user device and the computing device, a quantity of active network connections, a communication capacity, a projected usage during a projected period of increased network usage, or at least one bandwidth measurement.

37. The system of claim 31, wherein the computing device sending the portion of the content item at the second bitrate causes the user device to cache a subsequent portion of the content item at the second bitrate.

38. The system of claim 31, wherein the identifier of the portion of the content item at the first bitrate is in metadata associated with the portion of the content item.

39. The system of claim 31, wherein the request comprises a packet and wherein a name associated with the portion of the content at the first bitrate is in a first field of the packet and the first bitrate is in a second field of the packet.

40. A system comprising:
a user device configured to:
send a request for a portion of a content item at a first bitrate; and
receive the portion of the content item at a second bitrate, wherein the portion of the content item comprises an identifier indicating that the portion of the content item is at the first bitrate; and
a computing device configured to:
send the portion of the content item at the second bitrate.

41. The system of claim 40, wherein the request comprises a uniform resource locator (URL) associated with the portion of the content item and wherein the URL comprises the identifier.

42. The system of claim 40, wherein the request comprises a packet and wherein a field of the packet comprises the identifier.

43. The system of claim 40, wherein the portion of the content item at the second bitrate comprises metadata, wherein the metadata comprises the identifier indicating that the portion of the content item is at the first bitrate.

44. The system of claim 40, wherein the user device is further configured to receive a subsequent portion of the content item via a network connection from which the portion of the content item is received.

45. The system of claim 40, wherein the first bitrate is associated with a first network condition and the second bitrate is associated with a second network condition.

* * * * *